(12) United States Patent
McAdams et al.

(10) Patent No.: US 10,178,853 B2
(45) Date of Patent: Jan. 15, 2019

(54) WATER SUPPLY FOR ANIMALS

(71) Applicant: Crystal Spring Colony Farms Ltd., Ste. Agathe (CA)

(72) Inventors: Tom McAdams, Ste. Agathe (CA); Ethan Hofer, Ste. Agathe (CA); Lucien Dnestrianschii, St. Albert (CA)

(73) Assignee: Crystal Spring Colony Farms Ltd., Ste. Agathe, MB (CA)

( * ) Notice: Subject to any disclaimer, the term of this patent is extended or adjusted under 35 U.S.C. 154(b) by 587 days.

(21) Appl. No.: 14/790,241

(22) Filed: Jul. 2, 2015

(65) Prior Publication Data
US 2017/0000083 A1    Jan. 5, 2017

(51) Int. Cl.
*A01K 7/00*    (2006.01)
*A01K 7/06*    (2006.01)
*A01K 9/00*    (2006.01)

(52) U.S. Cl.
CPC ............... *A01K 7/06* (2013.01); *A01K 9/005* (2013.01)

(58) Field of Classification Search
CPC ... A01K 7/00; A01K 7/02; A01K 7/06; A01K 9/00; A01K 9/005
USPC ............................................. 119/75
See application file for complete search history.

(56) References Cited

U.S. PATENT DOCUMENTS 3,566,844 A * 3/1971 Occhiodori ............ A01K 7/06
119/71
3,581,713 A * 6/1971 Crooks ................... A01K 7/06
119/72.5
3,590,781 A * 7/1971 Spencer ............. A01K 39/0213
119/72.5
3,602,197 A * 8/1971 Fioretto ............. A01K 39/0213
119/72.5
3,611,999 A * 10/1971 Hey ...................... A01K 7/06
119/72.5
3,613,642 A * 10/1971 Restall .................. A01K 7/06
119/55
3,646,955 A * 3/1972 Olde ..................... A01K 7/06
119/75
3,698,685 A * 10/1972 Lang ..................... A01K 7/06
119/72.5

(Continued)

FOREIGN PATENT DOCUMENTS

CN       104430041         3/2015
WO    WO-9605725 A1 *   2/1996    ............. A01K 7/06

*Primary Examiner* — Monica L Williams
*Assistant Examiner* — Aaron M Rodziwicz
(74) *Attorney, Agent, or Firm* — Adrian D. Battison; Kyle R. Satterthwaiter; Ade & Company Inc.

(57) ABSTRACT

A water supply for an animal feeder includes a valve member on a nipple controlled by the animal connected to a water supply duct for supplying water to the valve member. A regulator is provided for controlling a flow rate and the nipple controls the flow rate by defining a housing through which the water passes with a resilient cylindrical body mounted in the housing. The resilient body defines a convoluted or serpentine water flow path therethrough or thereon for flow of water along the flow path through the housing with the flow path defining a rate of flow of the water. The housing has an adjustment member for adjusting application of pressure to the resilient body to change an amount of compression of the resilient body so as to distort the water flow path and change the rate of flow. The serpentine path is also of increased length to restrict the flow.

25 Claims, 8 Drawing Sheets

(56) References Cited

U.S. PATENT DOCUMENTS

| | | | | |
|---|---|---|---|---|
| 3,716,030 A * | 2/1973 | Godshalk | A01K 39/0213 119/72.5 |
| 3,756,199 A * | 9/1973 | Clark, IV | A01K 39/0213 119/72.5 |
| 4,006,716 A * | 2/1977 | Cross | A01K 7/06 119/72.5 |
| 4,014,365 A * | 3/1977 | Peterson | A01K 7/06 119/75 |
| 4,258,666 A * | 3/1981 | Edstrom | A01K 7/06 119/72.5 |
| 4,329,941 A * | 5/1982 | Niki | A01K 7/06 119/72.5 |
| 4,338,884 A * | 7/1982 | Atchley | A01K 7/06 119/72.5 |
| 4,356,998 A * | 11/1982 | Bach | F16K 25/00 119/75 |
| 4,391,225 A * | 7/1983 | Sparks | A01K 7/06 119/72.5 |
| 4,402,343 A * | 9/1983 | Thompson | A01K 7/06 119/72.5 |
| 4,403,570 A * | 9/1983 | Freehafer | A01K 7/06 119/72.5 |
| 4,406,253 A * | 9/1983 | Atchley | A01K 7/06 119/72.5 |
| 4,416,221 A * | 11/1983 | Novey | A01K 7/06 119/72.5 |
| 4,561,633 A * | 12/1985 | Haiges | A01K 7/06 119/75 |
| 4,586,464 A * | 5/1986 | Agerley | F16K 25/00 119/72.5 |
| 4,637,345 A * | 1/1987 | Hostetler | A01K 39/0213 119/72.5 |
| 4,660,508 A | 4/1987 | Kleinsasser | |
| 4,819,585 A * | 4/1989 | Dolan | A01K 7/06 119/72.5 |
| 5,065,700 A * | 11/1991 | Cross | A01K 7/06 119/72.5 |
| 5,255,632 A | 10/1993 | Thomas | |
| 5,373,811 A * | 12/1994 | Wastell | A01K 7/06 119/72.5 |
| 5,427,058 A * | 6/1995 | Chung | A01K 7/06 119/72.5 |
| 5,640,926 A | 6/1997 | McAdams | |
| 5,968,083 A | 10/1999 | Kleinsasser | |
| 6,748,899 B1 * | 6/2004 | Momont | A01K 39/0213 119/72.5 |
| 6,981,469 B1 * | 1/2006 | Welbourne | A01K 7/06 119/72 |
| 7,051,676 B1 * | 5/2006 | Deshaies | A01K 7/06 119/72.5 |
| 7,677,531 B1 * | 3/2010 | Hollars | F16K 1/16 119/75 |
| 7,810,787 B2 * | 10/2010 | Johnson | A01K 39/0213 119/72.5 |
| 7,832,356 B2 | 11/2010 | Kleinsasser | |
| 8,136,482 B2 * | 3/2012 | Tobita | A01K 39/0213 119/78 |
| 8,166,917 B2 * | 5/2012 | Welbourne | A01K 39/0213 119/72 |
| 8,844,467 B1 * | 9/2014 | Folkerts, Jr. | A01K 7/06 119/72.5 |
| 9,226,482 B2 * | 1/2016 | Cardaropoli | A01K 7/06 |
| 9,392,773 B2 * | 7/2016 | Willis | A01K 39/0213 |
| 9,433,190 B2 * | 9/2016 | Johnson | A01K 7/06 |
| 9,615,541 B2 * | 4/2017 | Herring, II | A01K 7/06 |
| 9,814,213 B1 * | 11/2017 | Lane | A01K 7/06 |
| 2010/0043716 A1 * | 2/2010 | Klanke | A01K 7/06 119/75 |
| 2017/0215376 A1 * | 8/2017 | Herring, II | A01K 7/06 |

* cited by examiner

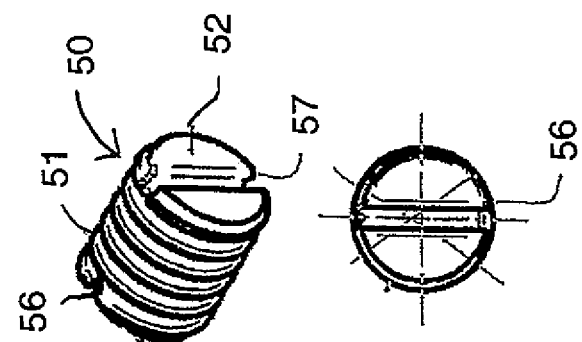
FIG. 5
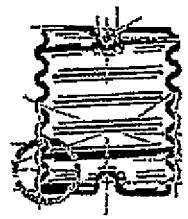
FIG. 6A
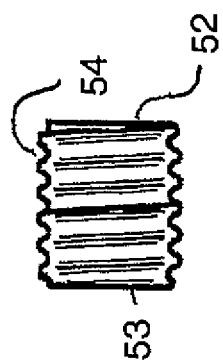
FIG. 6
FIG. 8
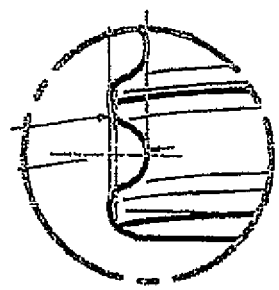
FIG. 7

WATER SUPPLY FOR ANIMALS

This invention relates to a water supply for animals which may be associated with a feeder for the animals or may be separate water supply system. Where used with a feeder, the feeder can be of the type for feeding dry feed in particulate form, which includes a substantially horizontal surface beneath a hopper so that the feed from the hopper is discharged onto the surface from which the feed can be transferred by the animal to a trough for mixing with water. However other feeders can be used.

BACKGROUND OF THE INVENTION

An example of a feeder of this type is shown in U.S. Pat. No. 4,660,508 (Kleinsasser) and this type of feeder has become very successful and is widely known as a wet/dry feeder in view of the fact that the animal can take dry feed from the shelf of the feeder or can apply water into feed discharged into the trough to take the feed in the trough in wet condition.

The intention is that the animals themselves control the amount of water supply by providing nipples in the trough which can be actuated by the animal to discharge water into the trough to mix with the feed. One advantage of this type of feeder is that the animals can mix the feed to the consistency they prefer so that they are encouraged to eat as much as possible by ensuring that they are not discouraged from eating by the feed being too dry or too wet. It has been found that this type of feeder has considerable increase in weight gain for the animals over conventional dry feeders.

Feeders of this type can either be double sided that is the feeder has two sides each of which can be accessed by a different set of animals so that generally the feeder is placed in a fence line to supply feed to animals in two separate panic. Other type of feeders are however single sided so that they have generally a vertical rear wall with the trough presented forwardly of that rear wall and the animals accessing the feeder only from the trough side of the rear wall.

In U.S. Pat. No. 5,640,926 of the present inventor issued Jun. 24, 1997 is disclosed a feeder of the above type. In this feeder, the height of the shelf from the trough is adjustable so as to accommodate a change in size of the animals from a smaller size up to a larger size as the animals grow.

In U.S. Pat. No. 5,967,083 (Kleinsasser) issued Oct. 19, 1999 is disclosed a feeder of the above type. In this feeder, the height of the side wall of the trough from the base of the trough is adjustable so as to accommodate a change in size of the animals from a smaller size up to a larger size as the animals grow.

Feeders of this type are designed and manufactured for hogs from weanlings up to finishers and the above adjustable types can be used in some circumstances to accommodate growth or different feeders of fixed dimensions for different sizes of animal may be provided.

One problem which has existed since the invention of this type of feeder is that the amount of water released into the trough can vary widely so that in some cases too much water is fed into the trough so that the feeder becomes overwhelmed with consequent blocking of the feed supply to the shelf. Of course the presence of the excess water also inhibits the feed intake of the animals. In other cases too little water is supplied which can again restrict feed uptake.

Many attempts have been made to overcome this problem by various techniques including controlling the pressure of the water supply to the nipples so that the amount dispensed is reduced.

In U.S. Pat. No. 7,832,356 (Kleinsasser) issued Nov. 16, 2010 is disclosed an arrangement of this type in which water is normally supplied through a first water supply line which has a series of nipples controlled by the animals. However, while the weanlings are very young the first water supply line is closed off and water is supplied from a second supply line which is managed by a timer.

In U.S. Pat. No. 5,255,632 (Thomas) issued Oct. 26, 1992 is disclosed an arrangement of this type in which the animals are free to operate as the nipples at their own volition but an additional sensor is provided in the trough which acts to control a valve in the supply line to prevent the water level exceeding a predetermined maximum.

Animal activated watering valves have been known for many years and are widely used. One example is the "Stingy Nipple" nozzles manufactured by Jalmarsons. This valve comprises a hollow nipple body and an actuator which is biased against an internal 0-ring seal by means of a conventional coil spring. The water actuator is biased to the neutral position in approximately the center of the hollow nipple body. When the animal desires a drink of water, the water may be activated by the animal's biting on the nipple body or otherwise moving the actuator. This causes the water actuator to be deflected from its neutral bias position, breaking the seal between the water actuator and the internal 0-ring. This in turn causes water to flow out of the nipple body for the animal.

One drawback of this type of nozzle waterer, is the weakness associated with the spring biasing member. While springs are well suited in applications involving compression, they are much less durable when the compression involves a lateral component as well as a longitudinal component. Such lateral component eventually leads to breakage of the spring. Consequently, many of these types of watering apparatus require the springs to be changed relatively frequently due to the breakage. As a result, numerous attempts have been made to replace the spring biasing member with a more resilient substitute.

These efforts have included the apparatuses included in the Sparks, Freehaufer, and Lang patents. These devices all substitute some material in place of the spring mechanism in order to bias the actuating pin into a neutral position.

Lang U.S. Pat. No. 3,698,685 discloses an animal actuated drinking valve having a tubular body member encasing an actuating pin urged forward by an elongated resilient biasing member. This forward biasing creates a fluid tight seal with an 0-ring within the tubular body member. Deflection of the actuating pin from its neutral biased position causes the seal between the 0-ring and the actuating pin to be open, resulting in the flow of liquid through the tubular body. The main body portion of the Lang biasing member is generally rectangular in shape and engages the inside surface of the tubular body. The biasing member includes a reduced forward portion cylindrical in shape which engages the rear surface of the sealing flange of the actuating pin.

Freehaufer U.S. Pat. No. 4,403,570 discloses a nipple type waterer with a resilient elastomeric plug functioning as both a spring and a flow regulating orifice. The elastomeric plug is designed for threadable engagement within the flow housing. The forward end of the resilient elastomeric plug contains a seal ring concentrically surrounding the orifice running longitudinally through the plug. The seal ring creates an annular sealing contact with the rear surface of the actuating pin and which maintains the actuating pin in a normal fluid tight sealing relation with a conventional 0-ring. As with the Lang device, deflection of the actuating pin from its normal biased position causes fluid to flow through the waterer.

Sparks U.S. Pat. No. 4,391,225 discloses another springless nipple waterer valve having a valve body in which a valve member is positioned and having a head projecting in bearing engagement with the abutment member of one end of the valve body. Contact between the apex portion of the abutment member and the valve member causes the valve member to maintain a neutral fluid tight seal against the 0-ring within the valve body. Deflection of the valve member of Sparks causes a fluid flow in the valve body similar to that in the Freehaufer and Lang patents, Water is not only important as an individual ingredient; it affects the feed intake of the animal as well. In the barns using the above feeder, too much or too little water will impact feed efficiency and performance.

In a feeder of the above type, the right amount of water is typically indicated by a thin film of water covering the bottom of the pan.

In the above feeder, the right water flow is between two and four cups per minute depending upon the age and size of the animals. Correct water pressure varies with the size and age of the animals: The correct amount of water for just weaned pigs should start at 2 cups/min and increase to about 3 cups/min when they achieve nursery size; grow/finish pigs should have water sized at 3-4 cups/min.

The water nipples presently available provide an arrangement which requires a constant water pressure in order to maintain a uniform water flow. However in barns the water pressure can vary from feeder to feeder and over time so that the amount of water supplied varies and typically fails to meet the above stipulated amounts.

SUMMARY OF THE INVENTION

It is one object of the present invention to provide an improved water supply for animals.

According to one aspect of the present invention there is provided a water supply for an animal comprising:

a valve member having a component operable by the animal for control by the animal of the dispensing of the water;

a water supply duct for supplying water to the valve member;

and a regulator for controlling a flow rate of the water from the valve when the component is operated to discharge the water, the regulator comprising:

a housing through which the water passes;

and a resilient body mounted in the housing;

the resilient body defining a convoluted water flow path therethrough or thereon for flow of water along the flow path through the housing with the flow path defining a rate of flow of the water;

the housing having an adjustment member for adjusting application of pressure to the resilient body to change an amount of compression of the resilient body so as to distort the water flow path and change the rate of flow.

The resilient insert pressure regulator is an important step in continuously improving wet/dry feeders. The proposed direction is to design a custom water pressure regulator with an incorporated portal for attaching cartridge water filters and future dispensing or purifying systems.

The use of the same system in water nipples, using resilient serpentine inserts, lead to the idea of using same principles of flow adjustment though amount of insert compression. The new design can replace the "poppet" and metal spring design of a common pressure regulator with a resilient serpentine insert as described hereinafter.

Common water pressure regulators adjust inlet pressure balancing a reference spring force with the outlet pressure. The new concept regulates outlet pressure based on flow demand and pre-set adjustments. This new concept will also eliminate the use of any metal springs.

Preferably the arrangement provides a path which is convoluted in the body so that it has a length greater than a straight path through the body. The path may have changes in direction such a labyrinthine arrangement or may form a constant curve such as a helix so that the term convoluted is intended to cover both arrangements.

In one preferred arrangement, which may be easier to manufacture, the path includes at least a part which is located on a surface of the body. However the path may be internal to the body such as by molding through the interior. This internal channel can also be reduced in cross-section by the compression of the body to reduce the flow rate. The external arrangement may be self-cleaning so as to discard particles due to flexing of the exterior channel.

Typically the external channel can be is in contact with a surface of the housing so that the compression of the body presses the surface of the body onto the surface of the housing to reduce a transverse dimension of the channel and therefore of the path.

Preferably the surface of the body is an exterior surface shaped to match an interior surface of the housing. In this arrangement the path can form a helix around the body. The body is typically circular cylindrical but other shapes can be used including rectangular bodies which slide inside a rectangular surface of the housing. In this case the channel or path can wrap peripherally around or along the sides.

In order to communicate the water onto the path, the body has an end face which communicates with an orifice defined in the housing. In this arrangement the body has a channel at the end face which communicates from the orifice, typically at the center of the end face outwardly to the path on the exterior of the body. Thus the channel in the end face may be a diametrically extending slot.

Preferably the resilient body is shaped as a loose fit within the housing and is forced outwardly into contact with a surface of the housing when compressed.

Preferably the housing is a two part housing with a first part threadedly connected to a second part such that adjustment of the threaded connection compresses the body to change the flow rate.

According to a second aspect of the invention there is provided a water supply for an animal comprising:

a water supply duct for supplying water;

a valve member on the water supply for controlling dispensing of the water, the valve member comprising:

a housing through which the water passes;

a component mounted in the housing and having a portion operable by the animal movable between an open position and a closed position for control by the animal of the dispensing of the water and;

the component being held in the closed position by a spring force;

and a body in the housing defining a convoluted water flow path therethrough or thereon which path is longer than a straight path through the body for flow of water along the flow path through the housing with the flow path defining a rate of flow of the water.

The body can be rigid or resilient. Where the body is resilient, compression of the resilient body can provide the spring force. However a separate spring can be provided either as a coil spring or as another resilient body. Where the body is rigid, another element must provide the spring force.

Preferably the housing has an adjustment member for adjusting application of pressure to the resilient body to change an amount of compression of the resilient body so as to distort the water flow path and change the rate of flow. However this Is not essential as the adjustment may be provided in a another manner in the housing or at another location in the water supply line.

One aspect of the convoluted path is that the path has a length greater than a straight path through the body.

Preferably the housing includes an orifice at or adjacent an inlet at an inlet end of the housing and the housing includes a closure member at the opposite end. The closure member typically comprises a flexible valve member such as an O-ring which sits against a seat at or adjacent a discharge opening of the housing. In this way the body in the housing defines a water flow path therethrough or thereon from the orifice to the closure member which path is longer than 3.0 inches or is longer than 5.0 inches or longer than 8.0 inches.

According to a further aspect of the invention there is provided a water supply for an animal comprising:
 a water supply duct for supplying water;
 a valve member on the water supply for controlling dispensing of the water, the valve member comprising:
  a housing through which the water passes;
  a component mounted in the housing and having a portion operable by the animal movable between an open position in which water is discharged through an opening in the housing and a closed position for control by the animal of the dispensing of the water;
  the component being held in the closed position by a spring force;
  an orifice in the housing providing a restriction through which the water passes;
  and a body in the housing defining a water flow path therethrough or thereon from the orifice to the discharge opening which path is longer than 3.0 inches and preferably the path is longer than 5.0 inches or longer than 8.0 inches.

Preferably there is provided a closure member movable by the component which sits in the closed position against a seat at or adjacent the discharge opening.

Preferably the component projects through the discharge opening for contact by the animal.

Extended analysis and trial of arrangements with valve designs of this general type have shown that one of the challenges is the formation of a small pressurized reservoir of water between the calibrating orifice plate and the biasing actuator flange. This can cause a small burst of water every time the actuator is triggered and the pressurized water is released. This burst of water can cause an overflow of water if frequent on-off periods are caused by the animals.

The present invention has identified the elements of the water nipple design that cause this initial water burst and provides a new valve design that eliminates the inconsistency of dispensing.

There was also taken in consideration the possibility of changing the design to facilitate the access and cleaning of the valve from the actuator end, without the need to replace the entire valve.

It has been found that the orifice plate of the nipple, which is provided with the main purpose to calibrate the water flow through the valve, is placed too far from the actuator. This will leave room for the body of the valve to become a small reservoir for periods of shut-off. The formation of the "mini" reservoir is the main cause of the initial burst until the pressure is eliminated through the opening of the valve. There are no components in the prior art valve to regulate the water jet due to variations in the water pressure.

Considering the above observations, the present arrangement described hereinafter moves in the direction in eliminating the initial water burst is to change the design of the resilient body (or silicone insert) and control the water pressure at the outlet port of the nipple valve.

In addition, to facilitate the access for cleaning, the body has been changed in design into two separate components.

Another drawback of this type of water supply nipple, is the frequent plugging or leaking of the valve. This is caused by an easy displacement of the rear end screening filter, allowing debris to enter in the sealing portion of the valve.

For repairing or cleaning, the valve needs to be removed completely from the feeders manifold and all components disassembled to access the water passages. This is a difficult operation and can cause serious damages if not discovered and repaired in time.

The length of the path in the body as may be provided by the serpentine channel will influence the reflection time and the inertia of water inside the valve. The longer the travel is, the longer the reflection time, that is the time it takes for the water wave to reflect at the outlet and return to the starting point. In addition, it has been found that the longer the travel, the larger the friction value and turbulence of the flowing water. This affects the inertia of the water flow for frequent on-off switching, where the inertia affects the flow of water when repetitive on-off periods accrue.

In operation, the actuator displacement opens the valve and water starts to flow. Due to the longer and restricted serpentine passages, this is not an instant reaction. The restricted serpentine insert will cause a small delay in the full water flow. When the actuator is released, the valve is switched off and the process is reversed. The passage acts as a shock absorber to dissipate the energy in the oscillations and reduce the amplitude of the oscillations to allow for a more constant water flow. A longer travel of the water will also create a drop in pressure due to turbulence and friction. This will allow using a higher pressure in the water circuit feeding all the valves in a barn circuit. The introduction of the new helical body also acts to reduce the formation of the mini water reservoir inside the valve. This will eliminate the initial burst of water when the activator is displaced. The true calibration of the valve will depend on the cross-sectional area of the helical channel, so that the conventional orifice plate has only the role of pre-adjusting the water flow. The required pressure at the nipple inlet can be calculated using Bernoulli Equation. The water nipple dispensing orifice is 0.078" DIA (2 mm), for dispensing 4 cups of water/min (0.25 gpm) and the pressure required is 3.61 psi.

The water nipple described herein can be used as a separate-alone water supply or as part of a method of feeding animals where the method comprises:
 providing for the animals access to a feeder;
 providing in the feeder an elongate trough having a base and a sidewall for receiving and containing feed and water and arranged such that the head of the animal can reach over an upper front edge of the sidewall to the base for eating the feed and water;
 providing in the feeder an elongate shelf providing a substantially horizontal surface for receiving feed;
 the horizontal surface of said shelf being arranged at a height above and rearwardly of said front edge so as to allow access by the head of the animal to said shelf for direct feeding therefrom, and between said shelf and said front edge to the base;

providing in the feeder a hopper for continually depositing feed onto said shelf arranged such that deposited feed on the shelf remains on said shelf but can be removed to the trough by the animal;

providing the water supply for the feeder for dispensing water into the trough including a pipe supplying water to the feeder.

BRIEF DESCRIPTION OF THE DRAWINGS

Embodiments of the invention will now be described in conjunction with the accompanying drawings in which:

FIG. 5 is an isometric view of the resilient insert for use within the nipple of FIG. 3.

FIG. 6 is a side elevational view of the resilient insert of FIG. 5.

FIG. 6A is a top plan view of the resilient insert of FIG. 5.

FIG. 7 is an enlarged view of one part of the resilient insert of FIG. 5.

FIG. 8 is a cross-sectional view of the resilient insert of FIG. 5.

DETAILED DESCRIPTION

Figure 1:
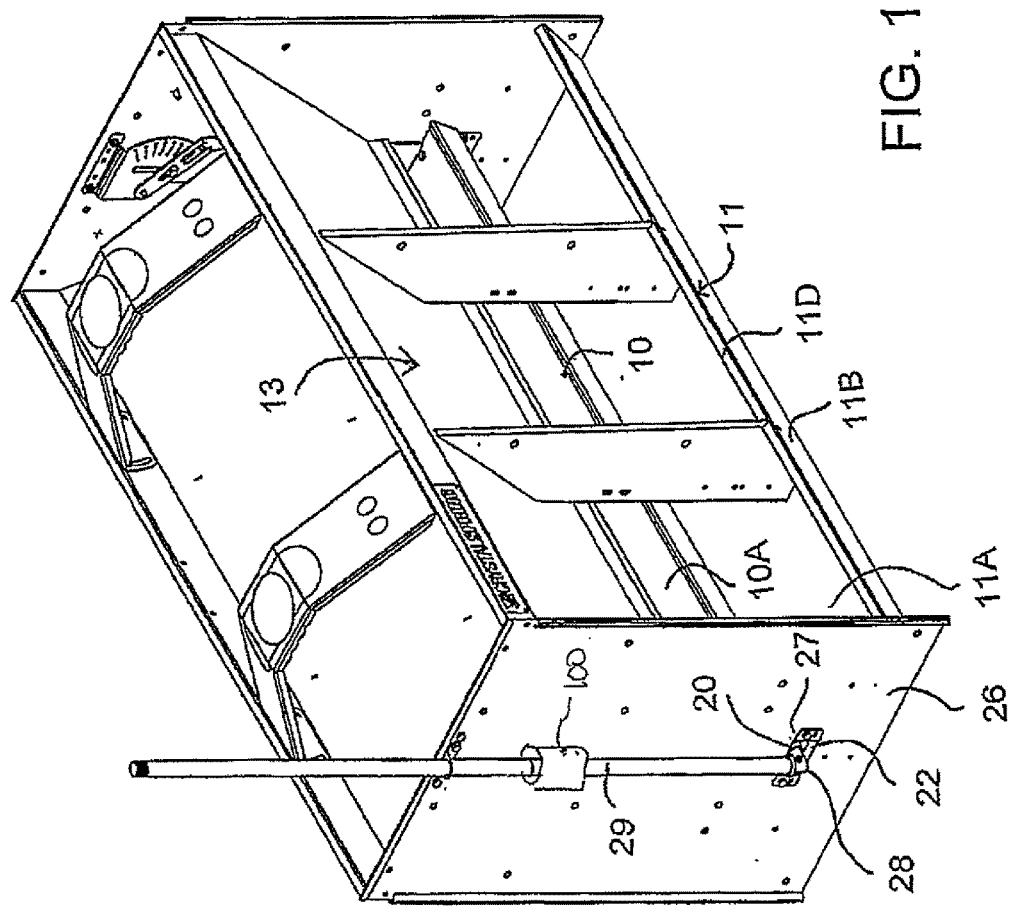
FIG. 1 is an isometric view of an embodiment of a feeder according to the present invention.
Figure 2:
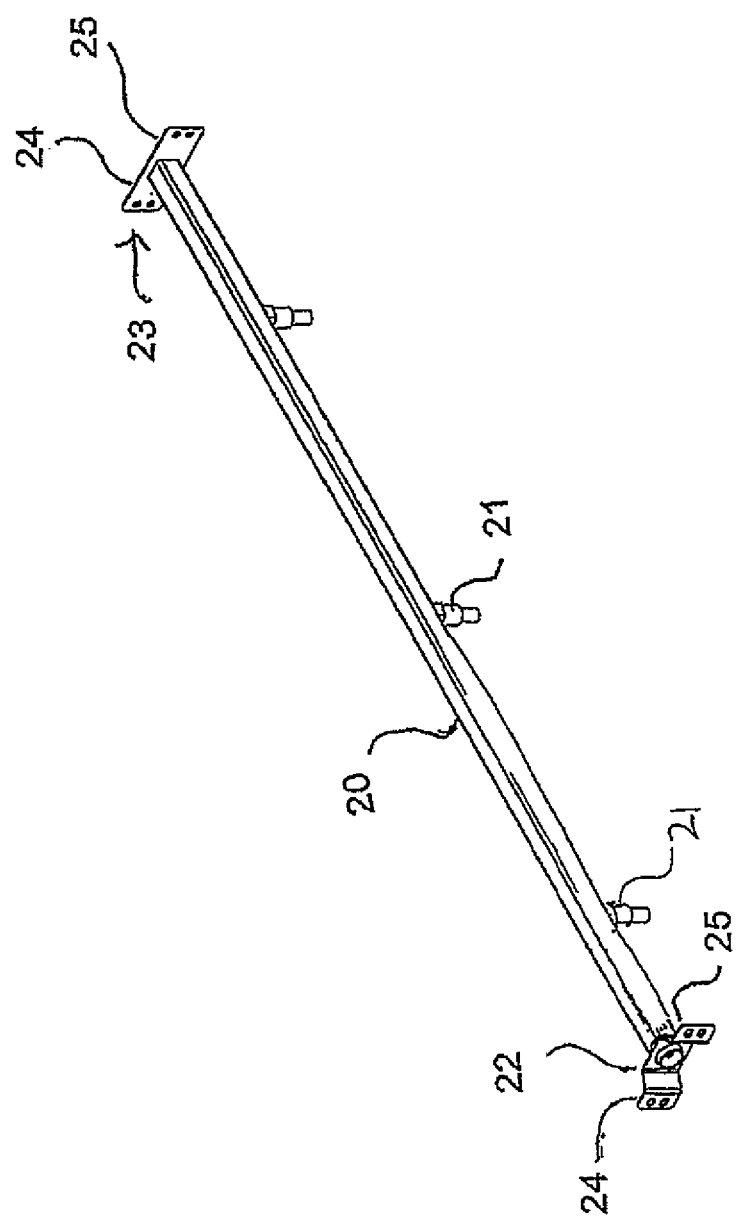
FIG. 2 is an isometric view of the water line of the feeder of FIG. 1.

The embodiment shown in FIG. 1 is of the type shown a wet and dry feeder or shelf-type feeder in which the feed is deposited onto a shelf 10 positioned above a trough 11 so that the feed is available in dry condition on the shelf 10 accessible by the animal and can be moved by the animal to the trough for mixing with water for taking in wet condition. A hopper 13 is located above the shelf for depositing the feed on the shelf. This type of feeder is well known and further details are shown in the above three patents of the present inventor, the disclosures of which are incorporated herein by reference.

The feeder can be double sided or single sided as is well known. The feeder can be adjustable as described in the second and third above patents or may be a fixed size feeder as disclosed in the first above patent.

Beneath the shelf is a first water line 20 with a series of animal controlled nipples 21 at spaced positions along the length of the water line which can be actuated by the animal to discharge water into the trough from the first water line. The nipples can be bite nipples which are not intended to drink from but discharge into the trough or they may be drinking nipples. When actuated water runs freely from the supply line 20 into the trough 11.

The water supply line 20 comprises an elongate tubular duct of square cross-section with the nipples attached onto a bottom face of the square tube. At each end of the tube is provided a respective bracket 22, 23 in the form of a plate with two side wings 24, 25 which bolt to a respective end wall 26 of the feeder.

As shown in previous examples of the feeder of the present Applicants, the end walls 26 are parallel and stand vertically so as to form ends of the hopper 13 and the trough 11. Each end wall has a hole 27 through which the end of the water line projects to allow the attachment of the bracket to the exterior of the end wall.

Water is supplied to the water line by a pipe 29 connected at the bracket 22 to the line 20 by an elbow 28 connected by a thread 28A. The pipe 29 extends vertically to an overhead connector of a water supply (not shown). The pipe is held vertical by a bracket 30 at the top of the wall 26 and by the bracket 22.

The arrangement herein therefore provides an apparatus and method of feeding animals where the feeder includes the elongate trough 11 having a base 11A and a sidewall 11B for receiving and containing feed and water and arranged such that the head of the animal can reach over an upper front edge 11D of the sidewall 11B to the base 11A for eating the feed and water.

The horizontal surface 10A of said shelf being arranged at a height above and rearwardly of the front edge so as to allow access by the head of the animal to the shelf for direct feeding therefrom, and between the shelf and the front edge to the base.

The hopper is arranged for continually depositing feed onto the shelf arranged such that deposited feed on the shelf remains on said shelf but can be removed to the trough by the animal.

The arrangement herein provides firstly a water flow regulator 100 and a modified water supply nipple 21 both of which use a novel flexible insert with an extended flow path as described above.

As shown in FIGS. 3 to 7, the water nipple 21 on the water supply for controlling dispensing of the water includes a housing 30 through which the water passes. The housing is formed in two parts 31 and 32 connected together at a threaded section 36 where the portion 31 carries a male threaded portion and the part 32 carries a female threaded portion for interconnection.

The housing provides a through bore 34 from an inlet end 39 to a discharge end 40. A center portion 55 of the bore is widened at a shoulder 35 to form a cylindrical chamber within the housing at the part 31. At the opposite end of the center portion is a shoulder 41 at the inner end of the second part. Beyond the shoulder 41 the housing opens wider to form a mouth up to the end 40. The inner end 39 carries a male threaded position 33 for threaded connection to a connector on the pipe 20.

Figure 3:
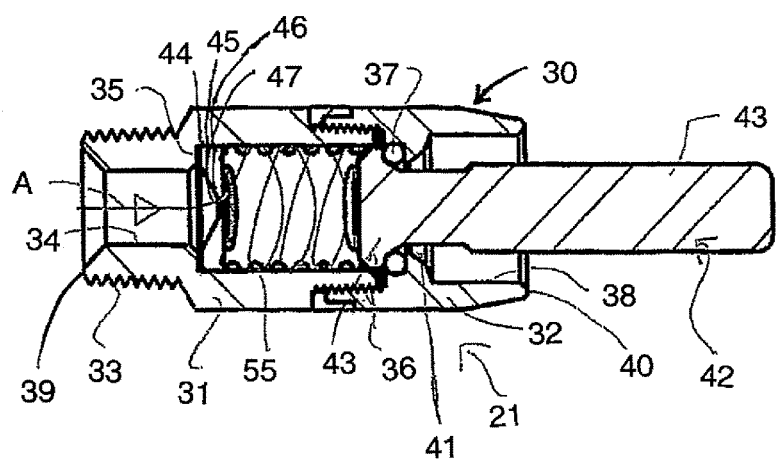
FIG. 3 is a cross-sectional view of one nipple of the set of nipples of FIG. 2 showing the construction of the water nipple according to the present invention and showing the nipple in the closed position.
Figure 4:
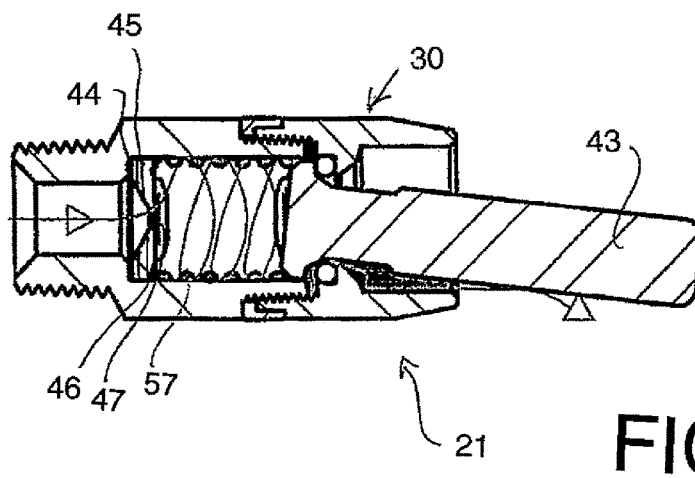
FIG. 4 is a cross-sectional view of the nipple of FIG. 3 showing the nipple in the actuated open position.
Figure 9:
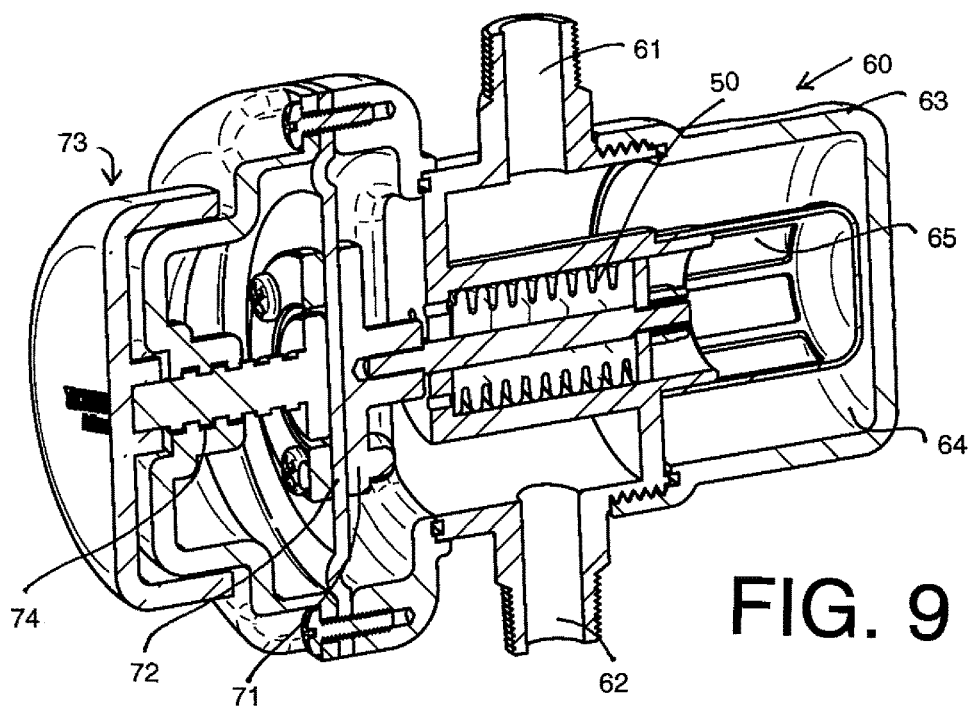
FIG. 9 is a first isometric view partly cut away to show a cross-section of a regulator using a serpentine channel according to the present invention.
Figure 10:
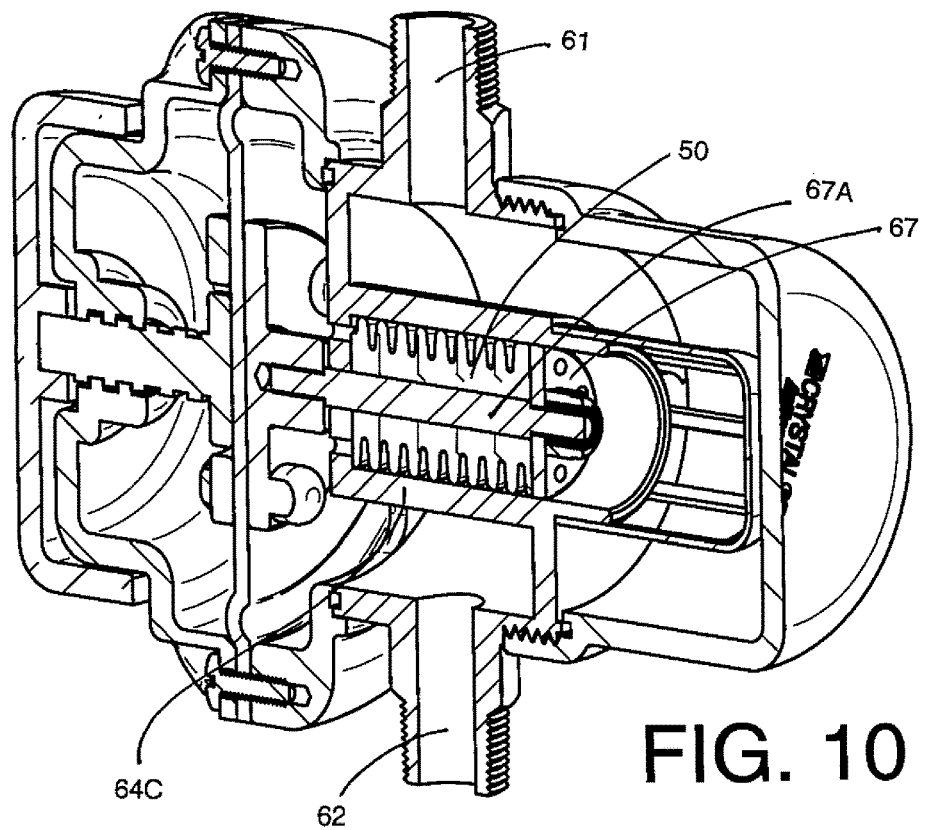
FIG. 10 is a second isometric view partly cut away to show a cross-section of the regulator of FIG. 9.

An actuator component 42 is mounted in the housing 30 and has an end portion 43 operable by the animal so that the actuator is movable between an open position shown in FIG. 4 and a closed position shown in FIG. 3 for control by the animal of the dispensing of the water.

The actuator includes a flange 43 inside the collar 41 so that the flange and shoulder contain an O-ring seal 37 which is squeezed between the flange and the shoulder 41. As shown in FIG. 4, movement to one side of the portion 43 within the wider mouth 38 lifts the flange 43 off the O-ring and allows water to pass from the center portion of the bore into the mouth 38 and from the discharge end 40 of the housing.

At the shoulder 35 is provided a series of disks forming a filter disk 44, followed by a shim disk 45 which sets a height from the shoulder 35 and followed again by an orifice disk 46 with a center orifice 47 lying on a center axis A of the bore.

Inside the center portion 55 of the bore is provided a resilient spring body 50 shown in FIGS. 5, 6 and 7 which is cylindrical with a peripheral surface 51 and end surfaces 52 and 53. The spring body provides a spring force between the orifice disk 46 and the end face of the flange 43 so as to bias the flange 43 into engagement with the O-ring 37 to tend to hold the actuator in the closed position.

The body 50 in the housing defines a convoluted water flow path in the form of a helical channel 54 on the peripheral surface 51 extending from the inlet end 53 at the orifice disk 46 to the end face of the flange 43. The channel 54 cooperates with the inside surface of the center portion 55 to form a helical path 57 through the housing from the orifice disk to the O-ring 37.

The helical path 57 is longer than a straight path through the body for flow of water along the flow path 57 through the housing with the flow path defining a rate of flow of the water.

The housing has an adjustment member defined by the shim disk 45 for adjusting application of pressure to the resilient body to change an amount of compression of the resilient body so as to distort the water flow path and change the rate of flow. That is the shim disk can be replaced by more or less disks or thicker disks to further compress the body longitudinally. The squeezes the channel, so that the channel is reduced in depth to change the cross-section of the path.

The peripheral surface of the body is an exterior cylindrical surface shaped to match the interior surface of the housing so that the body is resilient and is shaped as a loose fit within the housing. The compression provided by connection of the two portions of the housing thus acts to force the peripheral surface into contact with the surface of the housing when compressed to hold the body in place and to seal the surfaces between the channels to cause the water to flow only through the helical channel defining the path.

The body has a diametrical channel 56 at the end face 53 which communicates from the orifice 47 at the center to the helical path 54 on the exterior peripheral surface. At the other end 52 a channel can also be provided to make the body reversible, but at that end the water exiting the channel 54 passes between the end of the body and the flange 43 to pass by the O-ring when the valve is opened.

The length of the helical path 54 as shown above is the length of 6 circumvolutions of the body. The diameter of the body is approximate. W'DIA. (L=2*R*3.14*6=9.42")

For calculating the water pressure loss through the serpentine channel we approximated the length with 1ft and used the Hazen-Williams Equation for Pressure Loss in Pipes.

Figure 11:
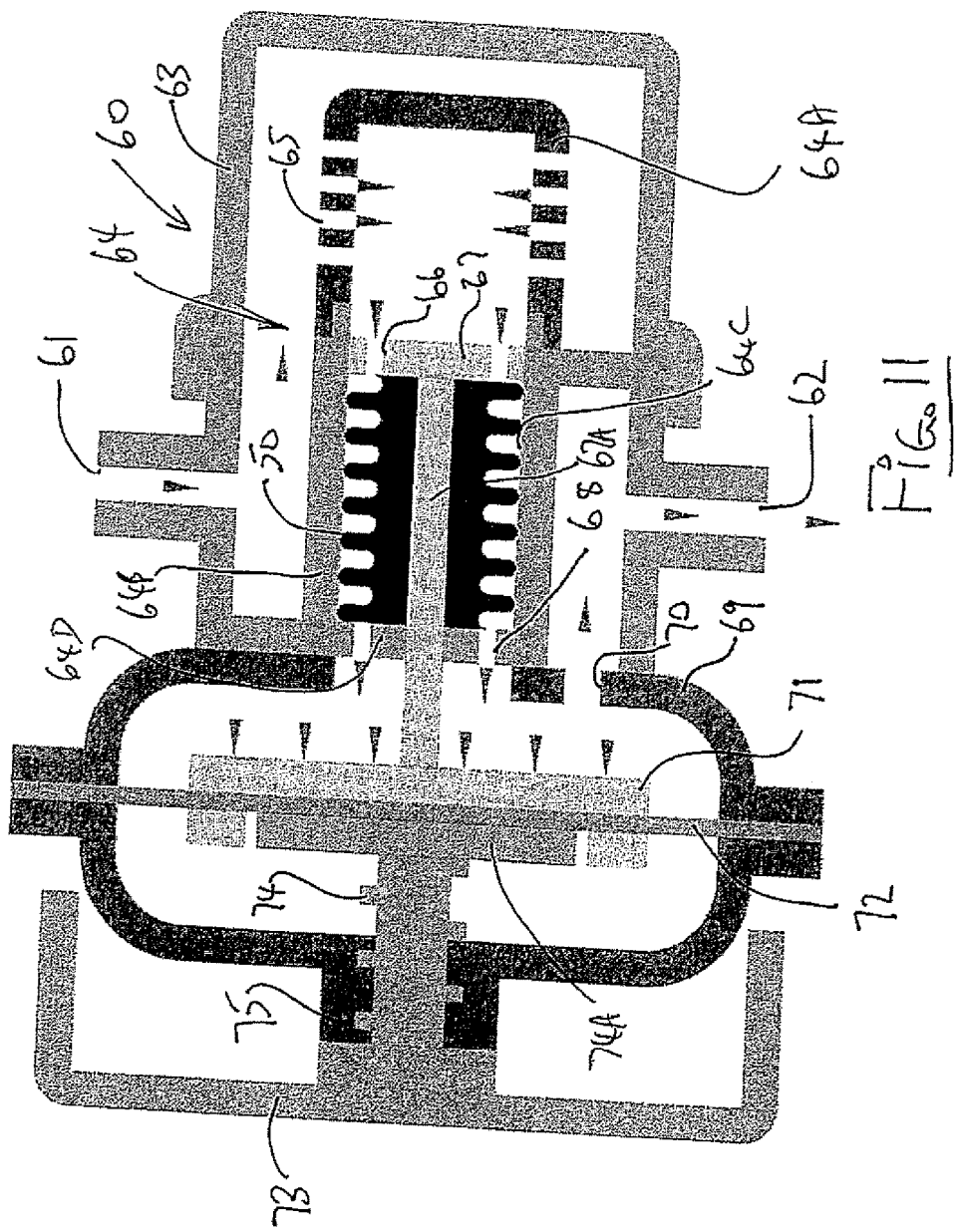
FIGS. 11, 12 and 13 are each a cross-sectional view through the regulator of FIG. 9 in first, second and third positions of operation.

As shown in FIGS. 9 to 13 is shown the flow regulator 100 which uses the same body 50 as previously described. Thus in FIG. 11 is shown the regulator for controlling a flow rate of the water from the valve when the component is operated to discharge the water which includes a housing 60 through which the water passes, a water supply duct 61 for supplying water to the regulator and an outlet duct 62 for supplying the regulated water supply to the downstream use location.

As previously described, the resilient body 50 defines a convoluted water flow path therethrough or thereon for flow of water along the flow path through the housing with the flow path defining a rate of flow of the water.

The housing 60 includes an outer cylindrical housing portion 63 and an inner housing portion 64 defining a channel therebetween into which the water from the inlet 61 enters. The water in the channel enters the inner housing 64 at an end portion 64A thereof through inlets 65 around the end portion. The water passes from the end portion into a center portion 64B which contains the resilient body 50 through inlets 66 in a piston 67 defining a movable end wall of the center portion 64B. The cylindrical inner surface 64C of the portion 64B closely surrounds the helical path on the body 50 as previously described along which the water from the inlets 66 passes to outlets 68 in an end wall 64D of the portion 64B.

The inlets 68 carry the water into a chamber 69 where the pressure of the water in the chamber 69 is applied against a plate 71 of a membrane 72 to apply force on the piston 67 through a shaft 67A to move the piston to the left or to the right depending on the changes of pressure in the chamber 69 on the right hand side of the membrane 72. The position of the membrane is adjusted by a screw handle 73 which operates a screw thread 74 within a receptacle 75 on the housing 69 so as to set a required pressure. As that the pressure varies due to fluctuations in flow rate, this pressure variation is applied to the membrane by the water in the chamber 69. This moves the plate 71 to change the position of the piston 67 to vary the pressure on the body 50 and thus change the cross-section of the serpentine path to restore the required pressure.

Thus the adjustment member or piston 67 acts to adjust application of pressure to the resilient body 50 to change an amount of compression of the resilient body 50 so as to distort the water flow path through the serpentine path and change the rate of flow.

The resilient insert pressure regulator is an important step in continuously improving wet/dry feeders.

The successful test results of the water nipples described above, using resilient serpentine inserts, lead to the development of the regulator using the of flow adjustment though amount of insert compression. The water pressure regulator thus adjusts regulates outlet pressure based on flow demand as detected by the plate 71 and based on the pre-set adjustments provided by the screw handle 73. This new concept eliminates the use of any metal springs.

FIG. 11 shows the pressure regulator with adjusting screw 75 in full tighten position. Screw seating plate 74A butts against the membrane 72 and hold the elastic diaphragm 72 in place and not allow inlet water pressure to compress the resilient insert 50. Water will flow through the filter and serpentine insert restricted only by the size and length of the serpentine channel.

Figure 12:
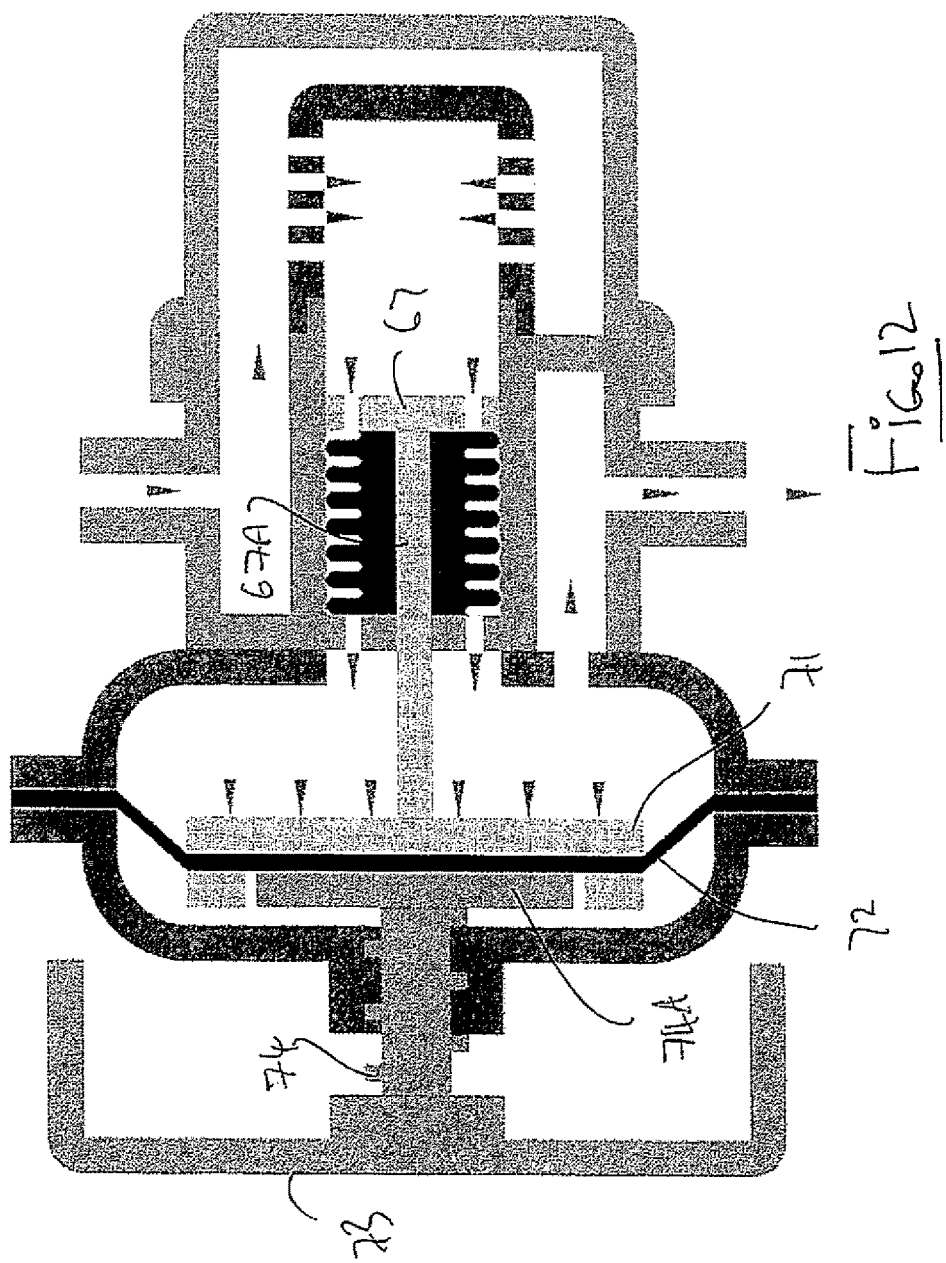

In FIG. 12 the position of the adjustment screw 74 determines the maximum compression of the insert 50 due to the location of the membrane 72, the plate 71, the shaft 67A and the piston 67. As the outlet flow is diminishing, pressure on the membrane 72 is rising and the force generated by the elastic membrane 72 is acting to compress the resilient serpentine insert 50. This will restrict the water channels till the point where the valve is closed. Demand for outlet flow will adjust supply channels and work to maintain this balance despite fluctuations in outlet flow as for example by the number of water nipples activated at the same time.

Figure 13:
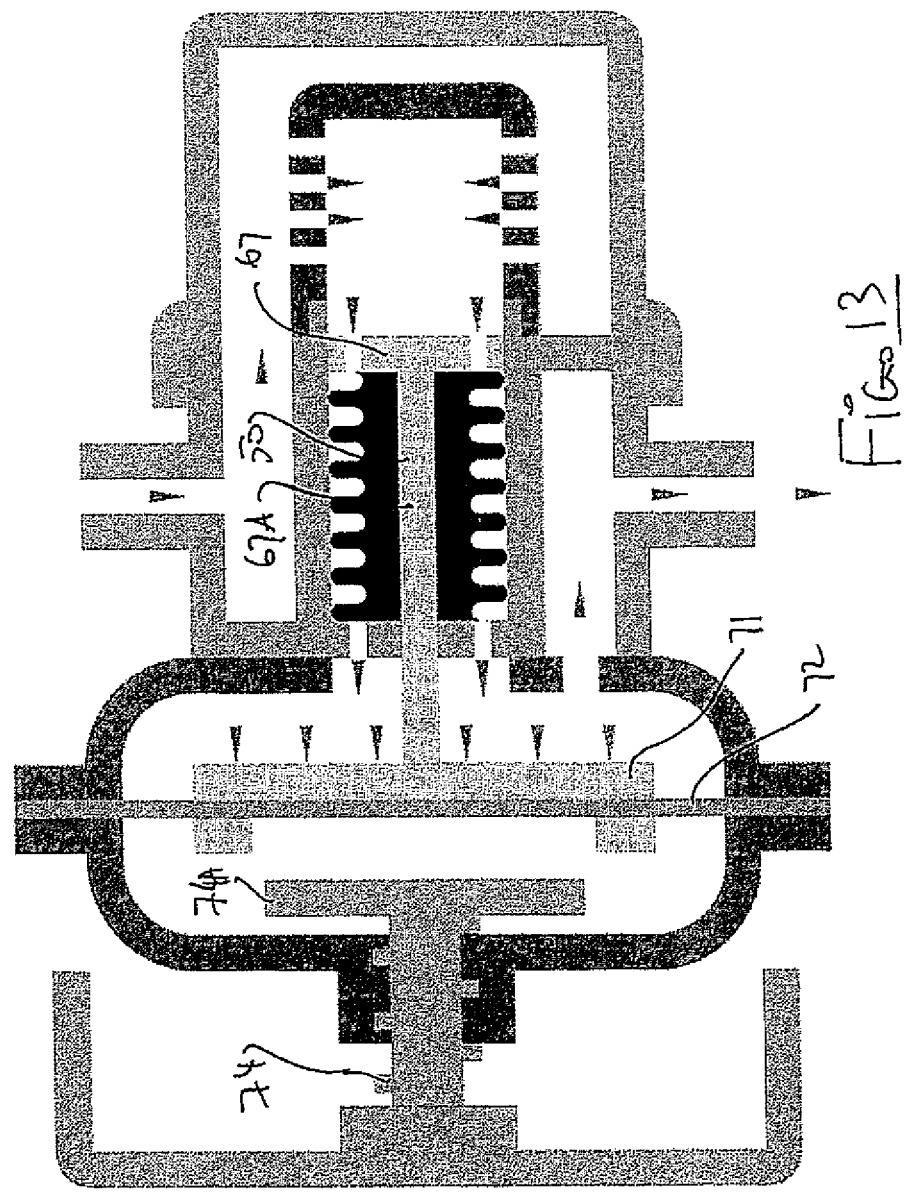

In FIG. 13, there is shown a sectional schematic of the pressure regulator in restricted position (open dial) and minimum flow demand. When water flow is at its maximum, pressure will not build up and the membrane will not restrict the input water channels.

The position of the adjustment screw will determine the maximum compression allowance of the serpentine insert.

The invention claimed is:

1. A water supply for an animal comprising:
a valve member having a component operable by the animal for control by the animal of the dispensing of the water;
a water supply duct for supplying water from a supply to the valve member;
and a regulator for controlling a flow rate of the water to the valve member from the supply so as to control a flow rate from the valve member to the animal when the component is operated by the animal to discharge the water, the regulator comprising:
a housing through which the water passes;
and a resilient body mounted in the housing;
a convoluted channel in the housing through which the water is confined to pass where the flow rate of water to the valve member is controlled by a transverse dimension of the convoluted channel so as to increase or decrease a rate of flow by increasing or decreasing the transverse dimension of the convoluted channel;
the convoluted channel having at least part of its transverse dimension along at least part of its length defined by a surface of the resilient body;
the housing having an adjustment member for adjusting application of pressure to the resilient body to change an amount of compression of the resilient body with an increase in compression acting to squeeze the convoluted channel so that the channel is reduced in transverse dimension which acts to reduce the flow rate;
wherein the adjustment member includes a member which is responsive to changes in pressure in the water for adjusting the application of pressure to the resilient body in response to said changes.

2. The water supply according to claim 1 wherein the convoluted channel is helical.

3. The water supply according to claim 1 wherein the convoluted channel includes at least a part which is located on a surface of the resilient body which is in contact with a surface of the housing so that the compression of the resilient body presses the surface of the resilient body onto the surface of the housing to reduce a transverse dimension of the convoluted channel.

4. The water supply according to claim 3 wherein the surface of the resilient body is an exterior surface shaped to match the surface of the housing which is an interior surface.

5. The water supply according to claim 4 wherein the convoluted channel forms a helix around the body.

6. The water supply according to claim 4 wherein the resilient body is circular cylindrical.

7. The water supply according to claim 4 wherein the resilient body has an end face which communicates with a water inlet orifice defined in the housing.

8. The water supply according to claim 4 wherein the resilient body is shaped as a loose fit within the housing and is forced into contact with a surface of the housing when compressed.

9. A water supply for an animal comprising:
a water supply duct for supplying water;
a valve member on the water supply duct for controlling dispensing of the water, the valve member comprising a housing through which the water passes;
a component mounted in the housing operable by the animal for controlling flow through a discharge opening and movable between an open position of the discharge opening for dispensing to the animal of the discharge opening and a closed position;
the component being held in the closed position by a spring force;
an inlet orifice in the housing providing a restriction through which the water passes from the supply duct to the discharge opening;
and a body in the housing defining at least one convoluted water flow channel therethrough or thereon;
the body being located between the inlet orifice and the discharge opening;
said at least one convoluted channel being arranged such that the water passing from the inlet orifice to the discharge outlet is confined to pass through said at least one convoluted channel which therefore acts to restrict flow of water through the housing;
said at least one convoluted channel defined by the body being longer than a straight path between the inlet orifice and the discharge opening.

10. The water supply according to claim 9 wherein the convoluted channel has a length greater than 3 inches.

11. The water supply according to claim 9 wherein the convoluted channel is helical.

12. The water supply according to claim 9 wherein the body is resilient.

13. The water supply according to claim 12 wherein compression of the body provides the spring force.

14. The water supply according to claim 12 wherein the convoluted channel includes at least a part which is located on a surface of the body which is in contact with a surface of the housing so that the compression of the body presses the surface of the body onto the surface of the housing to reduce a transverse dimension of the convoluted channel.

15. The water supply according to claim 12 wherein the surface of the body is an exterior surface shaped to match the surface of the housing which is an interior surface.

16. The water supply according to claim 15 wherein the convoluted channel forms a helix around the body.

17. The water supply according to claim 12 wherein the body is shaped as a loose fit within the housing and is forced into contact with a surface of the housing when compressed.

18. A water supply for an animal comprising:
a valve member having a component operable by the animal for control by the animal of the dispensing of the water;
a water supply duct for supplying water from a supply to the valve member;
and a regulator for controlling a flow rate of the water to the valve member from the supply so as to control a flow rate from the valve member to the animal when the component is operated by the animal to discharge the water, the regulator comprising:
a housing through which the water passes, the housing having an interior surface;
a resilient body mounted in the housing with an exterior surface of the resilient body in contact with the interior surface of the housing;
a recess located on the outer surface of the resilient body which is in contact with the interior surface of the housing so that the recess and the interior surface form a convoluted channel through which the water passes from the supply to the valve member;
the convoluted channel and the resilient body being arranged such that compression of the resilient body presses the outer surface of the resilient body onto the surface of the housing so that changes in compression change a transverse dimension of the convoluted channel and therefore a flow rate of the water through the convoluted channel;

the housing having an adjustment member for adjusting application of pressure to the resilient body to change an amount of compression of the resilient body for adjusting the flow rate.

19. The water supply according to claim 18 wherein the resilient body is circular cylindrical and wherein the convoluted channel forms a helix around the body.

20. The water supply according to claim 18 wherein the resilient body has an end face which communicates with a water inlet orifice defined in the housing.

21. The water supply according to claim 18 wherein the resilient body is shaped as a loose fit within the housing and is forced into contact with the interior surface of the housing when compressed.

22. A water supply for an animal comprising:
a water supply duct for supplying water;
a valve member on the water supply duct for controlling dispensing of the water, the valve member comprising a housing through which the water passes;
a component mounted in the housing operable by the animal movable between an open position in which water is discharged through an outlet opening in the housing for dispensing to the animal and a closed position;
an inlet orifice in the housing providing a restriction through which the water passes from the supply duct to the discharge opening;
a housing through which the water passes, the housing having an interior surface;
a resilient body mounted in the housing with an exterior surface of the resilient body in contact with the interior surface of the housing;
a recess located on the outer surface of the resilient body which is in contact with the interior surface of the housing so that the recess and the interior surface form a convoluted channel through which the water passes from the supply to the outlet opening;
wherein the resilient body applies a spring force to the component to move the component to the closed position so that operation of the component by the animal to the open position acts to compress the resilient body.

23. The water supply according to claim 22 wherein the resilient body is circular cylindrical and wherein the convoluted channel forms a helix around the body.

24. The water supply according to claim 22 wherein the resilient body has an end face which communicates with a water inlet orifice defined in the housing.

25. The water supply according to claim 22 wherein the resilient body is shaped as a loose fit within the housing and is forced into contact with the interior surface of the housing when compressed.

* * * * *